No. 736,438. Patented August 18, 1903.

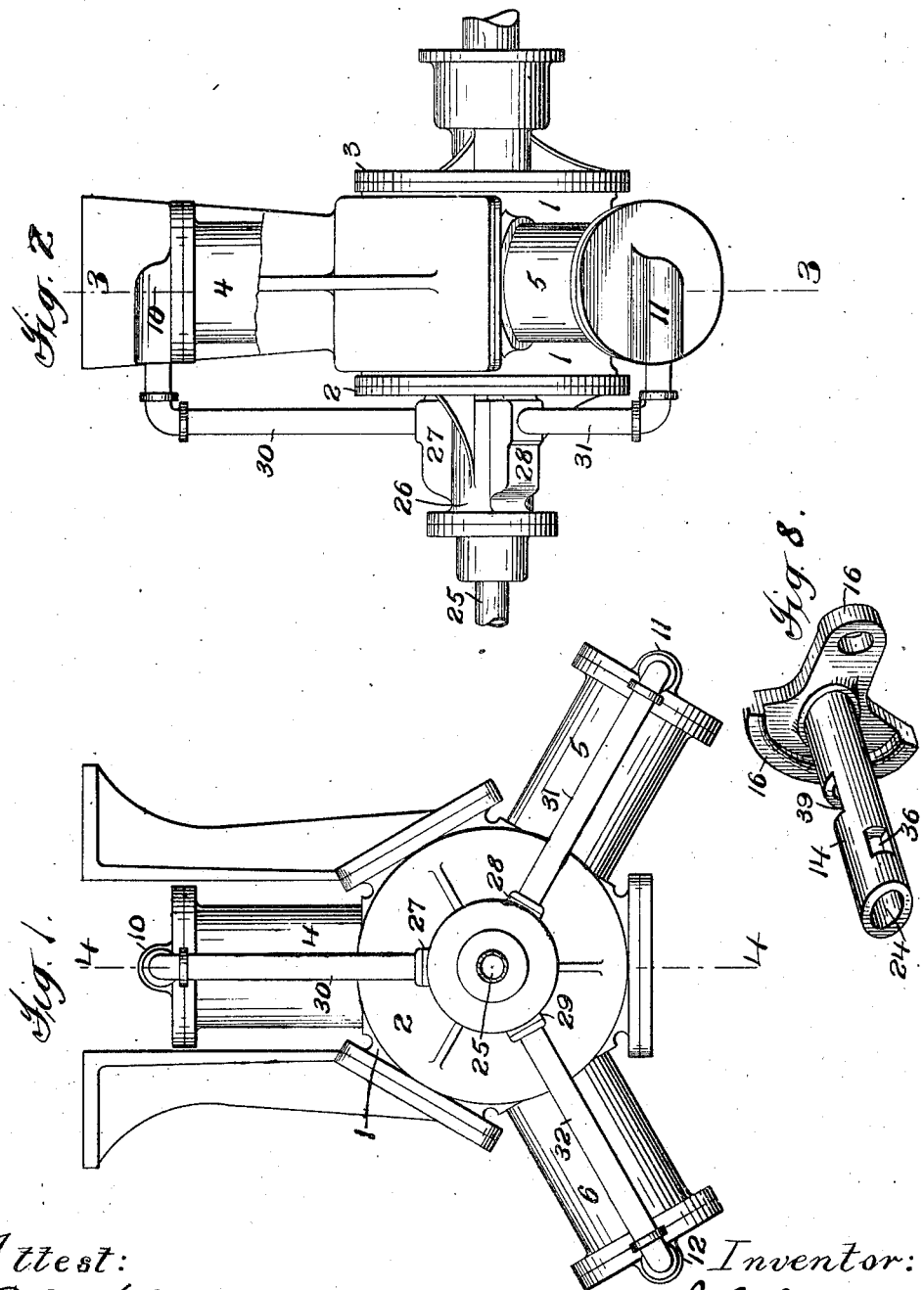

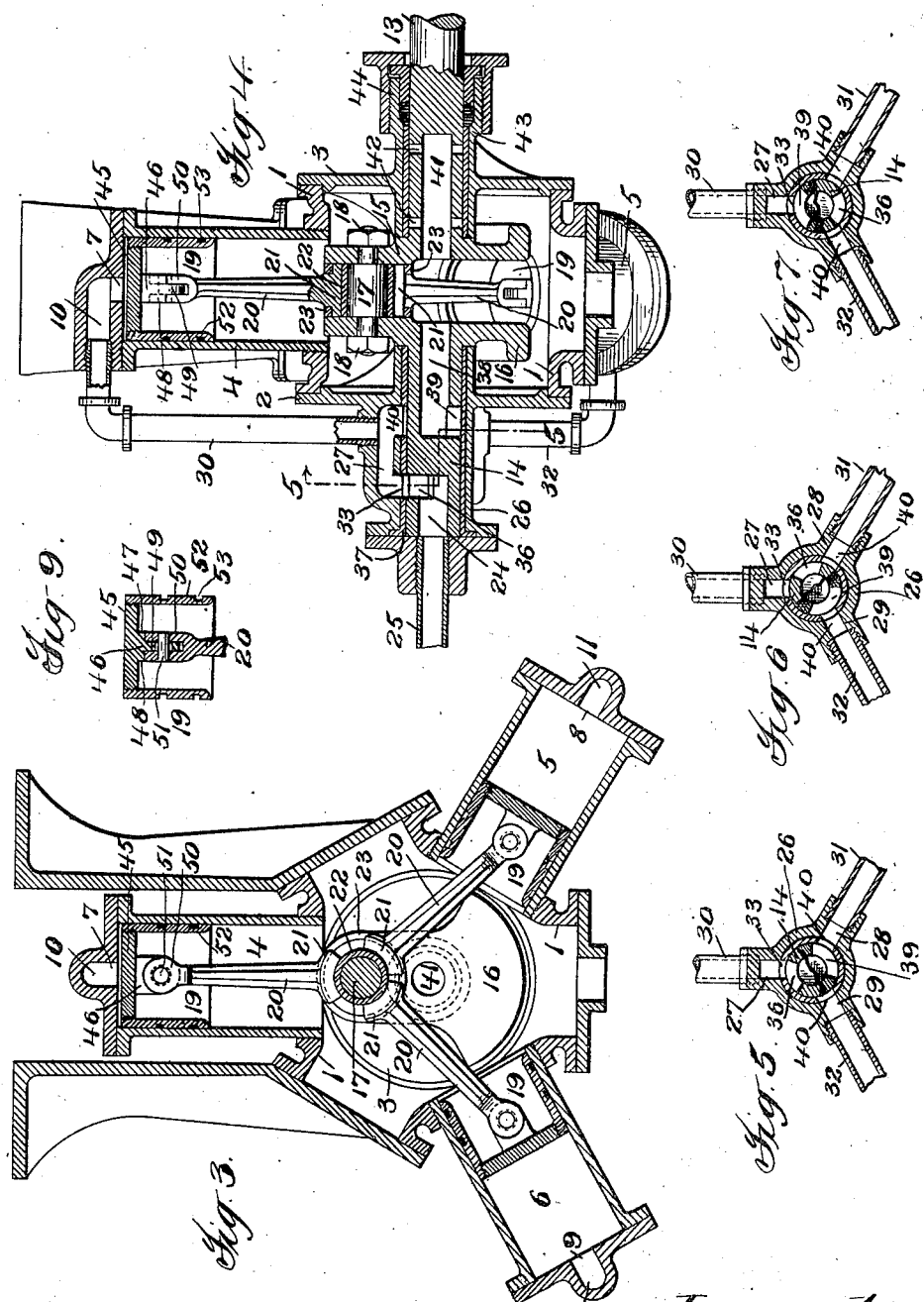

UNITED STATES PATENT OFFICE.

JAMES J. E. PHILIPS, OF NEW YORK, N. Y., ASSIGNOR OF ONE-THIRD TO JAMES C. WEIDER, OF FLUSHING, NEW YORK, AND WILLIAM A. GIBSON, OF BROOKLYN, NEW YORK.

ENGINE.

SPECIFICATION forming part of Letters Patent No. 736,438, dated August 18, 1903.

Application filed March 26, 1903. Serial No. 149,614. (No model.)

*To all whom it may concern:*

Be it known that I, JAMES J. E. PHILIPS, a citizen of the United States, residing at New York, county of Queens, and State of New York, have invented certain new and useful Improvements in Engines, fully described and represented in the following specification and the accompanying drawings, forming a part of the same.

This invention relates to certain improvements in engines, and has for one of its objects to produce an improved multicylinder-engine by which the actuating fluid—as, for instance, steam or air under pressure—is admitted to the cylinders at the proper time, the ports for controlling the flow of the fluid being so arranged as not to weaken the engine.

A further object of the invention is to generally improve certain details of engine construction.

With these and other objects in view the invention consists in certain constructions and in certain parts, improvements, and combinations, as will be hereinafter fully described and then specifically pointed out in the claims hereunto appended.

Referring to the accompanying drawings, Figure 1 is a front view of one form of engine embodying the invention. Fig. 2 is a side elevation of the construction shown in Fig. 1. Fig. 3 is a section on the line 3 of Fig. 2. Fig. 4 is a section on the line 4 of Fig. 1. Fig. 5 is a detail section on the line 5 5 of Fig. 4. Figs. 6 and 7 are detail sections similar to Fig. 5, but showing the parts in different positions. Fig. 8 is a perspective view of the drag end of the shaft. Fig. 9 is a detail view.

Referring to the drawings, which illustrate one embodiment of the invention, 1 indicates the cylinder-box, said box being closed by heads 2 and 3. Inasmuch as the engine which has been selected to illustrate the invention is of the three-cylinder type, the box has connected to it by screw-threads or in any other suitable manner three cylinders 4, 5, and 6. Each of the cylinder-heads is provided with a port for the admission of steam, these ports being respectively marked 7, 8, and 9. These ports communicate in the construction shown with small chambers 10, 11, and 12, formed on the respective cylinder-heads.

While the crank-shaft might be cast in one piece, in the construction shown and as preferred it will consist of two sections 13 and 14, the section 13 being provided with a crank-head 16. The crank-pin, which is marked 17, serves to hold the two parts of the shaft together, said pin being held in position by nuts 18 or in any other suitable manner.

Each of the cylinders is provided with a piston, the construction of which will be hereinafter described, the pistons being connected to the crank-pin 17 by means of connecting-rods 20, said rods having enlarged ends or heads 21, which bear against a bushing 22, which surrounds the crank-pin 17. The heads are held in position on the bushing by means of rings 23, two such rings being shown.

In the constructions heretofore employed, in which the crank shaft and pin are cast in one place, it has been usual in this type of engines to employ a two-part bushing and to secure the heads of the connecting-rods to the crank-pin by means of sectional rings. The employment of sectional rings is objectionable because of the liability of the bolts and nuts which connect the parts of the rings to break, and the use of a two-part bushing is objectionable because the dirt and sediment is liable to force itself between abutting ends of the bushing-sections and bind the bushing fast to the pin. The construction illustrated is therefore more effective, and it is cheaper and simpler.

Heretofore the steam in engines of the type selected to embody the invention has been led from the boiler to the cylinders through a passage or chamber in the shaft, which for a part of its length extended longitudinally thereof; but in such prior constructions, so far as known to me, the shaft has been provided with a plurality of ports or intake-openings which have been successively opened and closed, so that the passage or chamber is not in open communication with the boiler or other source of steam-supply. Furthermore, in these prior constructions the intake and exhaust ports for the steam have been formed through the side of the shaft, so as to intersect the longitudinal passage or chamber before referred to, and they have been located in the power end of the shaft—that is, the end of the shaft between the crank and the driving-wheel. The formation of these ports or openings by which the steam is led to and from a longitudinal passage in the shaft is not only expensive, but in engines employing two or more cylinders the plurality of openings if made sufficiently large to admit the full boiler-pressure of steam to the cylinders at the proper time greatly weaken the shaft.

In the preferred form of the construction embodying the present invention the crank-shaft is provided with a longitudinal passage or chamber for the admission of steam; but the said chamber, which is marked 24, is located in the drag end of the shaft—that is, the end of the shaft which is opposite the power end—and the said passage or chamber is in open communication with the boiler. While the construction by which this passage or chamber 24 is caused to be in open communication with the boiler may be varied in the preferred construction, the passage or chamber will be bored directly into the end of the shaft, so that its opening is in the end of the shaft, steam being conveyed into it in the construction shown by means of a pipe 25, leading to the boiler or other suitable source of steam-supply.

The construction by which the steam is conveyed from the passage 24 to the cylinders may be considerably varied. In the preferred form of the construction, however, the head 2 is provided with a projection 26, which may be integral with the head, as shown, said projection being provided with a plurality of chambers, one for each cylinder. In the present construction three such chambers are employed, said chambers being marked 27, 28, and 29. The chamber 27 is connected by means of a pipe 30 to the chamber 10 of the cylinder 4, the chamber 28 is connected by means of a pipe 31 to the chamber 11 of the cylinder 5, and the chamber 29 is connected by means of a pipe 32 to the chamber 12 of the cylinder 6. Each of the chambers 27, 28, and 29 is provided with an inlet-port 33, and the shaft is provided with a single outlet-port, (marked 36,) which as the shaft rotates is caused to register successively with the port 33 of each chamber 27, 28, and 29. In the preferred construction the usual bushing 37 will be provided inside the bearing formed in the extension or projection 26, and this bushing will of course be provided with ports which correspond with the ports 33.

With the construction as so far described it will be seen that the live steam from the boiler or other source of supply entering through the pipe 25 is by the rotation of the shaft allowed to pass through the port 36 and successively into the ports 33 of the chambers 27, 28, and 29. Inasmuch as only a single port is employed it can be made sufficiently large to admit the full boiler-pressure to each of the cylinders at the proper time, and inasmuch as this is the only port in the shaft the increase in size does not weaken the shaft, particularly as the port in the preferred construction is located in the drag end of the shaft. Attention is furthermore called to the fact that with this construction the ports can be elongated or made in the form of slots, so that only a very slight movement of the shaft is necessary to allow practically the entire boiler-pressure to be immediately transmitted to the pistons in the cylinders.

The devices by which the exhaust is effected may be widely varied. In the preferred form of the construction, however, and as shown, the drag end of the shaft will be provided with an exhaust-passage 38, which in its preferred form will be brought straight through the crank-head of this section of the shaft, so that the delivery-opening of the passage is located in the box. This passage 38 is provided with a port 39, which as the shaft rotates registers with any one of a plurality of ports 40, each of the chambers 27, 28, and 29 being provided with one of these ports. The bushing 37, before referred to, is of course provided with openings corresponding with these ports 40. The exhaust opening or port 39 is so located in the shaft as to permit each of the cylinders to exhaust after the succeeding cylinder has had steam admitted thereto and after the piston of that cylinder has begun its inward stroke, so that the full expansion of the steam is utilized in each cylinder. Furthermore, by causing the exhaust to be delivered into the interior of the box the steam and the lubricating-oil which it carries and the water of condensation act to lubricate the parts contained in the box and also the bearings of the crank-shaft. If desired, and as in the construction shown, the power end 13 of the shaft may be provided with a recess or chamber 41, which communicates with the box, and perforations 42 may be made through the outer wall of the chamber, so as to permit the lubricants to come into contact with the shaft bearing or bushing.

As shown, the head 2 is provided with an extension or projection 43, which gives a long bearing for the power end of the shaft, and any usual form of stuffing-box construction 44 is or may be provided.

While the pistons employed may be of any suitable construction, in the preferred construction these pistons will consist of heads 45, each of said heads being provided with a projection 46, which in the preferred form has two curved shoulders 47 48, between which lies a connecting-web 49. The connecting-rod is provided with a curved head 50, said head in the preferred form being forked, as shown, the web 47 lying between the forks of the curved head of the rod. The head is secured to the rod in any suitable manner—as, for instance, by passing a pin 51 through the forks and the web 49. Each piston is further provided with a guiding-flange 52, said flange being independent of the head and secured thereto in any suitable manner, as by screw-threads, as shown. This flange will be provided with grooves 53, in which suitable packing may be placed. By making the flange independent of the head it is possible to easily get at the interior projection of the head, so as to machine out the curved shoulders before referred to, so that the curve of the head of the rod may accurately fit the curve of the shoulders.

The head and rod are so assembled that the thrust of the piston against the rod on the inward movement of the head and the thrust of the rod on the outward movement of the head is taken by the curved shoulders of the projections and not by the pin which secures the parts together. This makes an exceedingly durable construction and one which can be very easily constructed.

While the construction illustrated embodies the several features of the invention in its preferred form, it is to be understood that changes and variations may be made therein without departing from the invention. The invention is not, therefore, to be limited to the specific details of construction hereinbefore described, and illustrated in the accompanying drawings.

What is claimed is—

1. In a multicylinder-engine, the combination with a crank-shaft chambered to form a steam-passage, said passage being in open communication with the boiler through an opening in the end of the shaft, of a plurality of ports, one for each cylinder, a connection from each of said ports to a cylinder, a port in the shaft arranged to register in succession with the cylinder-ports as the crank-shaft rotates, and suitable exhaust-ports, substantially as described.

2. In a multicylinder-engine, the combination with a crank-shaft chambered to form a steam-passage, said chamber having its entrance-opening through the drag end of the shaft and being in open communication with the boiler, of a plurality of ports, one for each cylinder, a connection from each of said ports to a cylinder, a port in the shaft arranged to register in succession with the cylinder-ports as the crank-shaft rotates, and suitable exhaust-ports, substantially as described.

3. In a multicylinder-engine, the combination with the box in which the cranks rotate, of a crank-shaft chambered to form steam and exhaust passages, the steam chamber or passage being in open communication with the boiler through an opening in the end of the shaft and the exhaust-passage leading into the box, of a plurality of ports, one for each cylinder, a connection from each of said ports to its cylinder, a port in the shaft arranged to register in succession with the cylinder-ports as the crank-shaft rotates, whereby steam is admitted in succession to the cylinders, and a port in the shaft leading into the exhaust-passage, said port being also arranged to register in succession with the cylinder-ports to permit the steam to exhaust, substantially as described.

4. In a multicylinder-engine, the combination with the box in which the cranks rotate, of a crank-shaft chambered to form steam and exhaust passages, the steam chamber or passage being in open communication with the boiler through the drag end of the shaft and the exhaust-passage leading into the box, a plurality of ports, one for each cylinder, a connection from each of said ports to its cylinder, a port in the shaft arranged to register in succession with the cylinder-ports as the crank-shaft rotates, whereby steam is admitted in succession to the cylinders, and a port in the shaft leading into the exhaust-passage, said port being also arranged to register in succession with the cylinder-ports to permit the steam to exhaust, substantially as described.

5. In a multicylinder-engine, the combination with a plurality of exhaust-ports one for each cylinder, a connection from each of said ports to the cylinder, a crank-shaft chambered to form an exhaust-passage, said passage leading into the box in which the crank-shaft rotates, a port in the shaft arranged to register in succession with the cylinder-ports as the crank-shaft rotates whereby the exhaust is led through the shaft into the box, substantially as described.

6. In a multicylinder-engine, the combination with the box, of a crank-shaft chambered to form a steam-passage and an exhaust-passage, the steam-passage being in open communication with the boiler through the drag end of the shaft and the exhaust-passage leading straight through the shaft into the box, of a plurality of chambers one for each cylinder, a pipe leading from each of said chambers to its cylinder, a steam-port in each of said chambers, a port in the shaft arranged to register in succession with the steam-ports as the shaft rotates, an exhaust-port in each chamber and a port in the shaft arranged to register in succession with these exhaust-ports, substantially as described.

7. In a multicylinder-engine, the combination with a two-part crank-shaft, of a crank-pin connecting the two parts of the shaft, a solid bushing surrounding said pin, connecting-rods extending from the crank-pin to the pistons, and solid rings securing said connecting-rods to the bushing and pin, substantially as described.

8. In a multicylinder-engine, the combination with the box to which the cylinders are secured, of a projection extending from one of the heads of the box and forming a bearing for the drag end of the shaft, said projection being provided with a plurality of chambers one for each cylinder, said chambers having steam and exhaust ports, a pipe connecting each of said chambers with its cylinder, a crank-shaft rotating in the box, said shaft being provided with steam and exhaust passages, the steam-passage being in open communication with the boiler and the exhaust-passage leading straight through the shaft into the box, said shaft also having a steam-port which is arranged to register in succession with the steam-ports of the chambers as the shaft rotates and an exhaust-port which is arranged to register with the exhaust-ports of the chambers, substantially as described.

9. In a multicylinder-engine, the combination with the box to which the cylinders are secured, of a projection extending from one of the heads of the box said projection being provided with a plurality of chambers one for each cylinder, said chambers having steam and exhaust ports, a pipe connecting each of said chambers with its cylinder, a two-part crank-shaft rotating in the box, the drag end of the shaft finding its bearing in the head and projection of the box and the other part of the shaft finding its bearing in the other head of the box, that part of the shaft having its bearing in the projection being provided with steam and exhaust passages, the steam-passage being in open communication with the boiler and the exhaust-passage leading straight through the crank and into the box, a port in the shaft arranged to register in succession with the steam-ports of the chambers, and a port in the shaft arranged to register in succession with the exhaust-ports of the chambers, substantially as described.

10. In a multicylinder-engine, the combination with the box to which the cylinders are secured, of a projection extending from one of the heads of the box, said projection being provided with a plurality of chambers one for each cylinder, said chambers having steam and exhaust ports, a pipe connecting each of said chambers with its cylinder, a two-part crank-shaft rotating in the box, the drag end of the shaft finding its bearing in the head and projection of the box and the other part of the shaft in the other head of the box, that part of the shaft having its bearing in the projection being provided with steam and exhaust passages, the steam-passage being in open communication with the boiler through the drag end of the shaft and the exhaust-passage leading straight through the crank end into the box, a port in the shaft arranged to register in succession with the steam-ports of the chambers, and a port in the shaft arranged to register in succession with the exhaust-ports of the chambers, substantially as described.

11. The combination with a piston-head having a curved interior projection, of a guiding-flange independent of the head and secured thereto, a connecting-rod having a curved head fitting the projection and bearing thereagainst, and means for securing the head of the connecting-rod to the projection, substantially as described.

12. The combination with a piston-head having an interior projection provided with two curved shoulders and a web lying between the shoulders, of an independent guiding-flange secured to the head, a connecting-rod having a curved forked head, the curved ends of the forks bearing against the curved shoulders of the projection on the head and the web of said projection lying between the forks of the head of the rod, and a pin passing through the forks and web, substantially as described.

In testimony whereof I have hereunto set my hand in the presence of two subscribing witnesses.

JAMES J. E. PHILIPS.

Witnesses:
W. A. GIBSON,
JAMES C. WEIDER.